Sept. 9, 1947.   F. W. LANCASTER   2,427,289
MECHANICAL EQUIVALENT OF HEAT APPARATUS
Filed Jan. 4, 1945
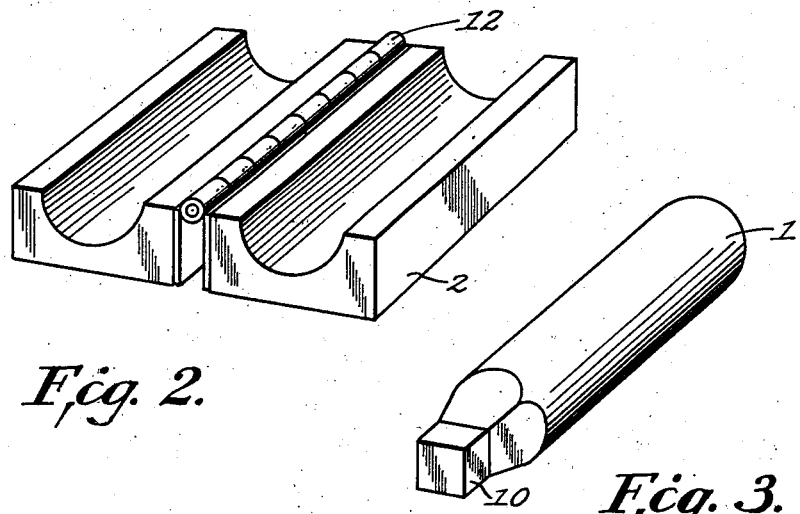
Fig. 2.
Fig. 3.
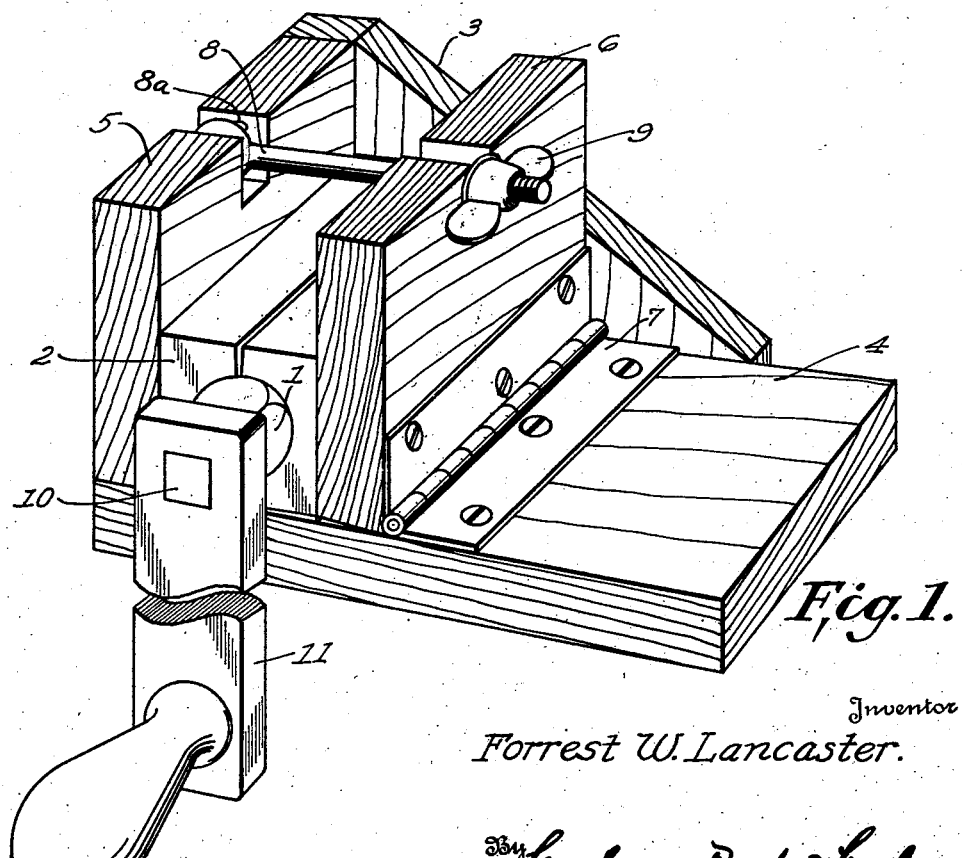
Fig. 1.
Inventor
Forrest W. Lancaster.

Patented Sept. 9, 1947

2,427,289

UNITED STATES PATENT OFFICE 2,427,289

MECHANICAL EQUIVALENT OF HEAT APPARATUS

Forrest W. Lancaster, Raleigh, N. C.

Application January 4, 1945, Serial No. 571,305

7 Claims. (Cl. 35—19)

This invention relates to apparatus and process for determining the mechanical equivalent of heat.

The mechanical equivalent of heat is the ratio of the number of absolute work units expended during any process to the number of heat units developed by the expenditure of this work. This ratio is a well established constant commonly called the Joule equivalent and is generally abbreviated "J". The Joule equivalent is such a fundamental physical constant that most high school and college physics courses include the determination of the value of J as part of the established teaching program. Several types of apparatus have been developed for classroom determination of this constant, both individually by the pupil and as a classroom demonstration. However, the apparatus which has been available and known heretofore either possesses a precision of measurement which is extremely poor or, in those cases where the precision of measurement is more accurate, the devices have been so complicated in construction and operation as to be unsuitable for individual student or students' use. Consequently, the apparatus employed heretofore for this purpose has generally either confused the student in his determination of the basic constant because of the large error in determination or has left the student unaware of the real significance of the constant and its determination because of inactive participation in its determination.

It is a principal object of this invention to provide new and unique apparatus for the determination of the mechanical equivalent of heat. Another object is the provision of apparatus which is simple enough in design so as to permit a student satisfactorily to operate it individually, and at the same time to attain a relatively high degree of precision of measurement. Another object is to provide such apparatus which, although it possesses a relatively high degree of precision of measurement, is rather inexpensive. Still another object is the provision of apparatus for the determination of the mechanical equivalent of heat which may be employed by a student in order to determine the Joule equivalent and when so employed by the student will give to the student a comprehensive understanding of the significance of this constant. Further objects and the entire scope of the present invention will become apparent from the detailed description given hereafter.

These objects are accomplished according to the present invention by the provision of an apparatus for the determination of the mechanical equivalent of heat which comprises a shaft, a split bearing conforming to this shaft, a means for holding or clamping the split bearing about the shaft, so as to permit the shaft to be rotated within the bearing while the bearing is applied thereto under a constant predetermined pressure, and a crank or other means for rotating the shaft within the bearing while under this predetermined pressure.

The apparatus and process of the present invention may be more fully comprehended by referring to the appending figures of a preferred embodiment of this invention in which:

Figure 1 is a perspective view of an assembled apparatus embodying this invention.

Figure 2 is a detailed perspective view of the split bearing.

Figure 3 is a detailed perspective view of the shaft.

Referring in more detail to Figure 1, this perspective view of one of the preferred forms of the present apparatus illustrates a shaft 1 surrounded by the conforming bearing 2 which is held about the shaft 1 by the clamping device. The bearing 2 and shaft 1 constitute the friction element of my invention.

The clamping device consists of a base 4; a stationary end member 5; a side member 3; and a movable member 6, attached to the base 4 by means of a hinge 7. The application of a constant pressure to the bearing 2 to hold it about the shaft 1 is accomplished through the action of the bolt 8, which is attached by means of pin 8a to stationary member 5, and wing nut 9.

Shaft 1 is provided at one end with a constricted, polygonal projection 10 for engagement of the crank 11 with the shaft 1.

The preferred form of the split bearing 2 is illustrated in more detail in Figure 2. This drawing shows the split bearing 2 with the two separate halves of the bearing joined together by the hinge 12.

Figure 3 shows in detail the shaft 1 and the constricted, polygonal projection 10 on one end thereof for engaging the shaft 1 with the crank 10 or other suitable driving means.

The shaft 1 and the split bearing 2 of my apparatus may be fabricated from any suitable material. However, it is preferable that both the shaft and the bearing be made of the same material and that this material be a metal possessing good abrasion resistance and thermal conductivity characteristics. The sections of the split bearing may be completely disjoined from one another but for ease of manipulation of the apparatus it has been found preferable to join the sections by means of movable hinges to form a structure such as illustrated in Figure 2. The exact dimensions of the shaft and split bearing, i. e., the friction element, of my apparatus are not critical and may be varied over any limits consistent with the spirit of the invention.

Various means may be used to hold the split bearing about the shaft during the determination of J with my apparatus. However, the means employed for this purpose should be capable of holding the bearing about the shaft with a constant and predetermined pressure. Furthermore, it is preferable, that this holding or clamping means be either thermally insulated from the bearing and the shaft or be fabricated from material of low heat conductivity. In addition, this holding means should be of such a construction so as to permit the bearing and shaft to be rapidly removed therefrom during the use of the apparatus. I have found that wood makes a very good material of construction for this clamping means although other materials such as phenolic laminates, plastic materials and the like may be employed for this purpose. This clamping device may assume various forms. One form of clamping means which I have found especially useful is that illustrated in Figure 1.

As there shown the clamping means is made up of the base 4; the stationary end member 5; the side member 3; and the hinged member 6. This forms a housing for the split bearing 2 which is open only at the top and one side. Made of material which has an insulating effect, as described, such housing serves to retard rapid dissipation of heat generated when shaft 1 is rotated in bearing 2, so that loss of heat between completion of rotation of the shaft and removal and transfer of shaft and bearing to the calorimeter cup is minimized.

The shaft 1 may be rotated within the split bearing 2 by any suitable means which permits the force and work employed in rotating the shaft to be determined or calculated. Whatever the means which is employed for this purpose, it must be capable of rapid connection to and detachment from the shaft. In the preferred form of my apparatus the rotation of the shaft within the split bearing is accomplished by means of a crank which is readily engageable with or detachable from the shaft. Engagement of the crank with the shaft is more readily accomplished by providing the shaft 1 with a constricted, polygonal projection 10 and providing the crank 11 with a corresponding polygonal opening. Obviously, the exact structure of the crank or projection 10 on the shaft is not critical in this invention and may be varied. A particular advantage in using a crank as the driving means for the shaft resides in the fact that it permits the work in-put of the apparatus to be applied directly without loss of efficiency and to be readily calculated.

The determination of the mechanical equivalent of heat using my apparatus is accomplished according to the following procedure. The friction element, i. e., the shaft 1 and the bearing 2, is accurately weighed. The inner cup of a double walled calorimeter of sufficient capacity to contain the friction element is also accurately weighed. Sufficient water to fill the calorimeter cup 16 approximately one half full of water is then adjusted to a temperature, by either heating or cooling, which corresponds to the temperature of the calorimeter cup and the friction unit. This water is then charged into the calorimeter cup and the cup and its contents are weighed, after which the weight of the water is calculated by subtracting the weight of the cup from the weight of the cup plus water. The split bearing 2 is then placed about the shaft 1 and this friction element is then quickly placed in the clamping device 3 and clamped rigidly therein. The clamping device is preferably clamped or fastened to the working table as illustrated in Figure 5. The crank 11 is then attached to the shaft 1 after which the length of the lever arm or the distance from the center of the crank handle to the center of the shaft 1 is accurately measured. The pressure applied by the clamping device 3 upon the split bearing 2 is now adjusted by manipulation of the wing nut 9 until a spring balance attached to the crank arm so as to pull tangentially with the crank records a pull of, for example, about 2,000 grams when the crank is turning uniformly. Any standard spring balance capable of measuring above 2000 grams may be employed for measuring the force necessary to turn the crank. The measurement of this force is readily made by attaching the hook end of the balance to the crank handle and pulling on the other end of the balance with sufficient force to cause the crank to just begin to turn. The weight indication on the balance during this pulling operation is then recorded and represents the force required to overcome the friction existing between the split bearing 2 and the shaft 1.

The water within the calorimeter is stirred with a thermometer and the temperature of the water is recorded. The shaft 1 is then rapidly rotated for about 50 turns by rotating the crank. The exact number of turns is noted and recorded. After this rotation operation, the force required to rotate the shaft within the bearing is again quickly determined by the use of the spring balance as indicated above. The average of the force taken at the beginning of the crank operation and the force to rotate the crank after the completion of the operation is the required average force used to calculate the work done. As soon as the force required for this rotation is determined, the split bearing 2 and its shaft 1 are very quickly released from the clamping device 3 and placed immediately into the calorimeter where the heat increase in the friction element is determined in known fashion.

The various values determined by the above operation of my apparatus, such as the force applied to the crank arm, the length of the crank or lever arm, the mass of water, the mass of the friction element, and the rise in temperature of the body of water permit the value of the Joule equivalent, J, to be readily determined in accordance with established theory and equations.

The present invention provides a simple, inexpensive apparatus and process for the determination of the mechanical equivalent of heat. In addition to its simplicity of operation and its inexpensiveness, my apparatus possesses a relatively high degree of precision of measurement. These factors permit the apparatus to be employed individually by students in classroom and to permit students to appreciate and understand the significance of the constant which they determine during the use of the apparatus.

As many varied and different modifications of the present invention will become apparent to those skilled in the art from the detailed de-

I claim:

1. In an apparatus for determining the mechanical equivalent of heat comprising a rotatable shaft, a split friction member embracing said shaft, a quick-release clamping element separate from said shaft and friction member to receive said shaft and member and exert pressure thereon, and a crank detachably coupled to said shaft, whereby the shaft and embracing member may be rapidly separated from said other elements without any substantial loss of heat and placed into a calorimeter.

2. In an apparatus for determining the mechanical equivalent of heat comprising a rotatable shaft having a prismatic extension on one end, a split friction member embracing said shaft, a quick-release clamping element separate from said shaft and friction member to receive said shaft and member and exert pressure thereon, and a crank with a prismatic opening at one end to embrace said prismatic extension on said shaft, whereby the shaft and embracing member may be rapidly separated from said other elements without any substantial loss of heat and placed into a calorimeter.

3. The apparatus of claim 1 in which the parts of the split bearing are hinged together.

4. Apparatus for determining the mechanical equivalent of heat comprising a rotatable shaft, a friction member embracing said shaft, an insulating housing separate from said shaft and member to receive said shaft and member, clamping means separate from said shaft and member to exert pressure on said friction member and shaft, and a crank detachably coupled to said shaft.

5. Apparatus for determining the mechanical equivalent of heat comprising a friction element consisting of a rotatable shaft and a split bearing conforming to said shaft, an insulating housing separate from said friction element to receive said element consisting of a base, an end and one side wall secured to said base, a second end wall movably hinged to said base, means to actuate said movable end wall to clamp said split bearing about said rotatable shaft, and a crank detachably coupled to said shaft.

6. Apparatus for determining the mechanical equivalent of heat comprising a rotatable shaft; a friction member embracing said shaft; an insulating housing having base, end, and side walls to receive said shaft and friction member, and clamping means to exert pressure on said friction element and shaft.

7. Apparatus for determining the mechanical equivalent of heat comprising a rotatable shaft; a friction member embracing said shaft; an insulating housing having a stationary base, end, and side walls and a movable end wall to receive said shaft and friction member; and means to actuate said movable end wall to clamp said friction member and shaft together.

FORREST W. LANCASTER.

REFERENCES CITED

The following references are of record in the file of this patent:

UNITED STATES PATENTS

| Number | Name | Date |
| --- | --- | --- |
| 358,164 | Post | Feb. 22, 1887 |
| 1,146,448 | Reeves | July 13, 1915 |
| 1,242,863 | Reeves | Oct. 9, 1917 |
| 134,229 | Thurston | Dec. 24, 1872 |

OTHER REFERENCES

Ganot's Physics, 15th Ed., 1898, pages 474, 475, 479.